(12) United States Patent
Takii et al.

(10) Patent No.: US 6,250,281 B1
(45) Date of Patent: Jun. 26, 2001

(54) DIRECT INTAKE PORT AND HELICAL INTAKE PORT FOR ENGINE

(75) Inventors: Osamu Takii; Kiyoshi Hataura; Manabu Miyazaki; Hiroshi Suzuki; Masayuki Hagiwara; Takatoshi Imai, all of Sakai (JP)

(73) Assignee: Kubota Corporation (JP)

( * ) Notice: Subject to any disclaimer, the term of this patent is extended or adjusted under 35 U.S.C. 154(b) by 0 days.

(21) Appl. No.: 09/394,350

(22) Filed: Sep. 13, 1999

(30) Foreign Application Priority Data

Jun. 15, 1999 (JP) .................................................. 11-168223

(51) Int. Cl.[7] ................................................. F02B 31/00
(52) U.S. Cl. ........................................ 123/308; 123/188.14
(58) Field of Search ..................................... 123/308, 306, 123/188.14

(56) References Cited

U.S. PATENT DOCUMENTS

| | | | |
|---|---|---|---|
| 3,945,363 | * 3/1976 | Elsbett et al. | 123/306 |
| 4,180,041 | * 12/1979 | Miyazaki et al. | 123/188.14 |
| 4,207,854 | * 6/1980 | Alford et al. | 123/306 |
| 4,308,832 | * 1/1982 | Okumura et al. | 123/306 |
| 4,498,435 | * 2/1985 | Kromer | 123/306 |
| 4,779,594 | * 10/1988 | Oda et al. | 123/308 |
| 5,081,965 | * 1/1992 | Walters et al. | 123/188.14 |
| 5,165,374 | * 11/1992 | Chapman et al. | 123/308 |
| 5,836,284 | * 11/1998 | Oda et al. | 123/308 |
| 5,913,554 | * 6/1999 | Oda et al. | 123/308 |
| 6,055,727 | * 5/2000 | Brignall et al. | 123/306 |

* cited by examiner

Primary Examiner—Erick Solis
(74) Attorney, Agent, or Firm—Bacon & Thomas PLLC (57) ABSTRACT

An entire peripheral surface of a port bent portion (5) of a direct intake port (2) has a peripheral side surface portion (11) close to a cylinder axis (10). The peripheral side surface portion (11) provides a projection (12) for deviating intake air current (A) from the peripheral side surface portion (11) toward an opposite peripheral side surface portion (13). Further, the bent portion (5) has a peripheral side surface portion (14) close to an upper end surface (9) of a cylinder chamber (8), which provides a projection (15) for deviating the intake air current (A). This projection (15) turns a direction of the intake air current (A) from a peripheral side surface portion (14) close to the upper end surface (9) of the cylinder chamber (8) toward an opposite peripheral side surface portion (16).

8 Claims, 8 Drawing Sheets

PRIOR ART

PRIOR ART

DIRECT INTAKE PORT AND HELICAL INTAKE PORT FOR ENGINE

BACKGROUND OF THE INVENTION

1. Technical Field of the Invention

The present invention relates to a direct intake port and a helical intake port both used for various kinds of engines such as a diesel engine, a gasoline engine or a gas engine.

2. Preamble Structure

Figure 8A:
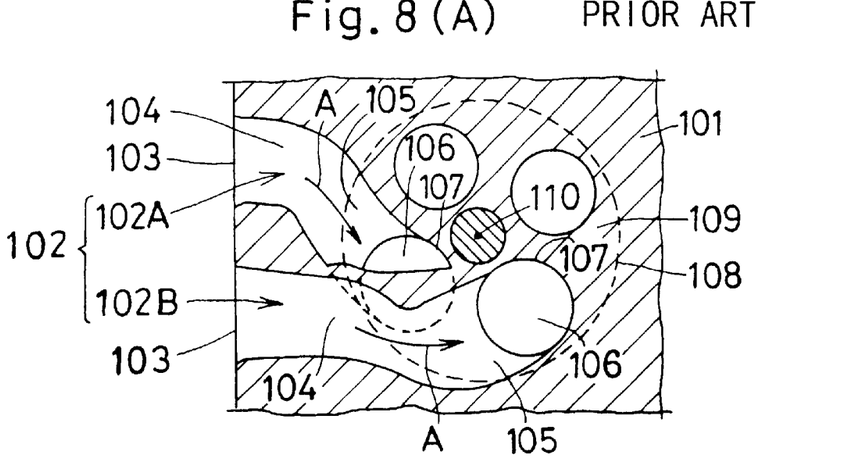
FIG. 8(A) is a cross sectional plan view.
Figure 8B:
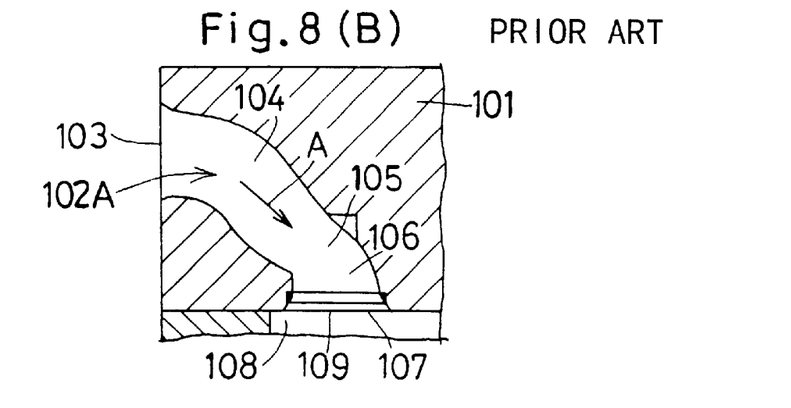
FIG. 8(B) is a vertical sectional front view of a first intake port 102A.
Figure 8C:
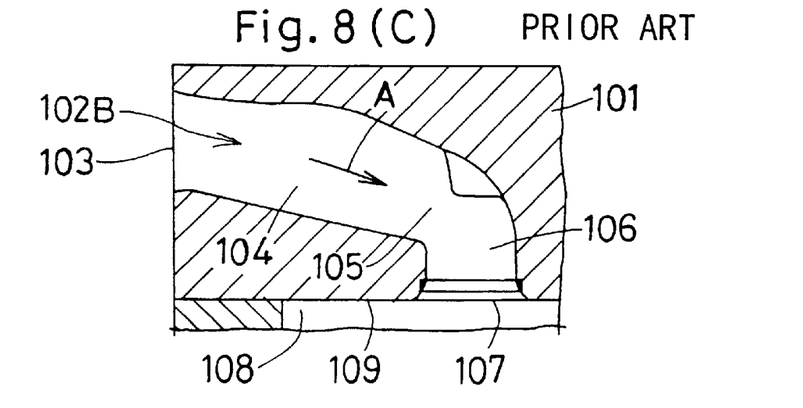
FIG. 8(C) is a vertical sectional front view of a second intake port 102B.

The direct intake port for an engine according to the present invention is directed to those each of which has the following preamble structure, for example, as shown in FIG. 1(A) to FIG. 1(E) (present invention) or FIG. 8(A) to FIG. 8(C) (prior art).

Figure 1A:
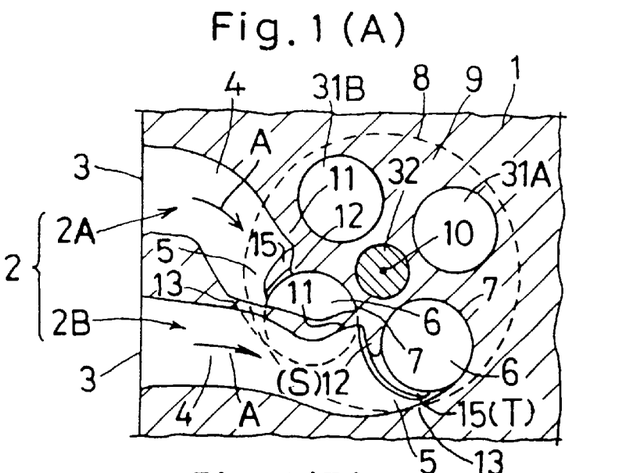
FIG. 1(A) is a cross sectional plan view.
Figure 1B:
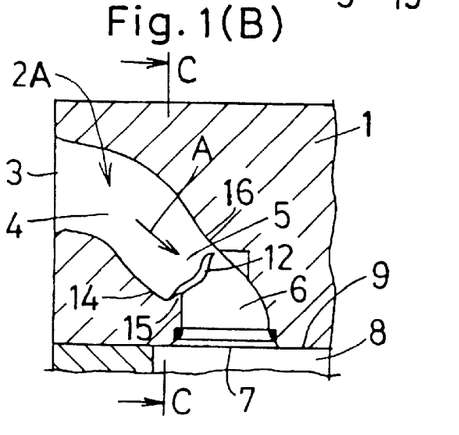
FIG. 1(B) is a vertical sectional front view of a first direct intake port 2A.
Figure 1C:
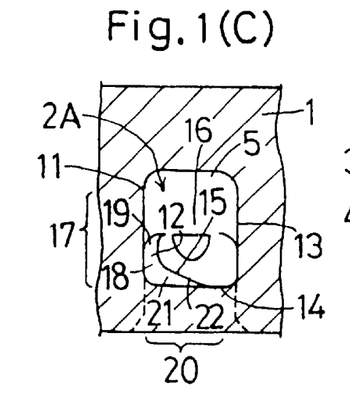
FIG. 1(C) is a sectional view taken along a line C—C in FIG. 1(B)
Figure 1D:
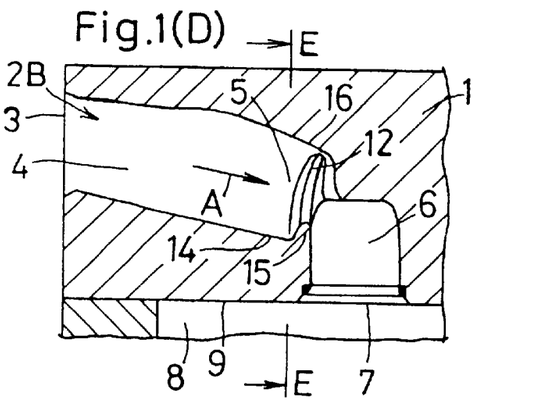
FIG. 1(D) is a vertical sectional view of a second direct intake port 2B.
Figure 1E:
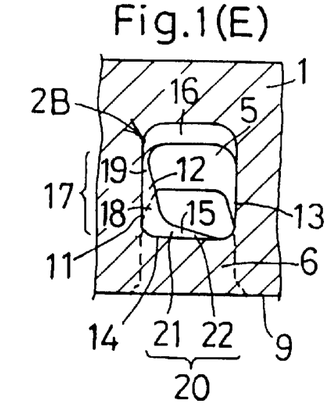
FIG. 1(E) is a sectional view taken along a line E—E in FIG. 1(D)

FIG. 1(A) to FIG. 1(E) show a direct double intake port for an engine according to the present invention. FIG. 1(A) is a cross sectional plan view. FIG. 1(B) is a vertical sectional front view of a first direct intake port 2A. FIG. 1(C) is a sectional view taken along a line C—C in FIG. 1(B). FIG. 1(D) is a vertical sectional front view of a second direct intake port 2B. FIG. 1(E) is a sectional view taken along a line E—E in FIG. 1(D).

FIG. 8(A) to FIG. 8(C) show a conventional direct double intake port for an engine. FIG. 8(A) is a cross sectional plan view. FIG. 8(B) is a vertical sectional front view of a first intake port 102A. FIG. 8(C) is a vertical sectional front view of a second intake port 102B.

An engine has a cylinder head 1, 101 provided with a direct intake port 2, 102. This direct intake port 2, 102 is formed by communicating a port inlet 3, 103 with a port outlet 7, 107 through a port upstream portion 4,104, a port bent portion 5,105 and a port downstream portion 6, 106 in order. This port outlet 7, 107 is opened at a position eccentric from a cylinder axis 10, 110 of an upper end surface 9, 109 of a cylinder chamber 8, 108.

3. Prior Art

FIG. 8(A) to FIG. 8(C) show an example of conventional shapes of the bent portion 105 of the direct intake port 102 in the preamble structure.

FIG. 8(A) to FIG. 8(C) illustrate a conventional direct double intake port for a vertical diesel engine. FIG. 8(A) is a cross sectional plan view. FIG. 8(B) is a vertical sectional front view of a first intake port 102A. FIG. 8(C) is a vertical sectional front view of a second intake port 102B.

The bent portion 105 is formed so as to only smoothly continue the upstream portion 104 with the downstream portion 106. Therefore, it flows an intake air current (A) from the upstream portion (104) to the downstream portion (106) smoothly.

The prior art has the following problems.

As is well known, the direct intake port is formed by putting importance on the increase of volumetric efficiency. Accordingly, there is produced insufficient swirl within the cylinder chamber 108, which results in a disadvantage of failing to mix air with fuel satisfactorily.

The smoothly continued shape of the bent portion 105 of the conventional direct intake port 102 shown in FIG. 8(A) to FIG. 8(C) cannot improve the disadvantage of producing insufficient swirl the direct intake port 2 has by nature

SUMMARY OF THE INVENTION

The present invention has the following objects:

1. To improve the disadvantage of producing insufficient swirl the direct intake port has by nature, through devising the shape of the bent portion of the direct intake port, thereby enhancing the mixing efficiency of air with fuel and eventually promoting the engine's high output, low fuel consumption and reduction of unburnt poisonous substances (such as carbon monoxide, hydrocarbon and particulate) contained in the exhaust gas; and 2. To further strengthen the swirl force the helical intake port has by nature, through devising the shape of the bent portion of the helical intake port, thereby more enhancing the mixing efficiency of air with fuel and further promoting the engine's high output, low fuel consumption and reduction of unburnt poisonous substances (such as carbon monoxide, hydrocarbon and particulate) contained in the exhaust gas.

A direct intake port for an engine according to each of a 1st to a 9th aspects of the present invention is characterized by adding to the above-mentioned preamble structure the following features for the shape of the bent portion 5 of the direct intake port 2, for example, as shown in FIG. 1(A) to FIG. 1(E), and FIGS. 2 to 4 so as to solve the foregoing problems.

FIG. 1(A) to FIG. 1(E) show a direct double intake port for a vertical diesel engine according to a first embodiment of the present invention. FIG. 1(A) is a cross sectional plan view. FIG. 1(B) is a vertical sectional front view of a first direct intake port 2A. FIG. 1(C) is a sectional view taken along a line C—C in FIG. 1(B). FIG. 1(D) is a vertical sectional front view of a second direct intake port 2B. FIG. 1(E) is a sectional view taken along a line E—E in FIG. 1(D).

Figure 2:
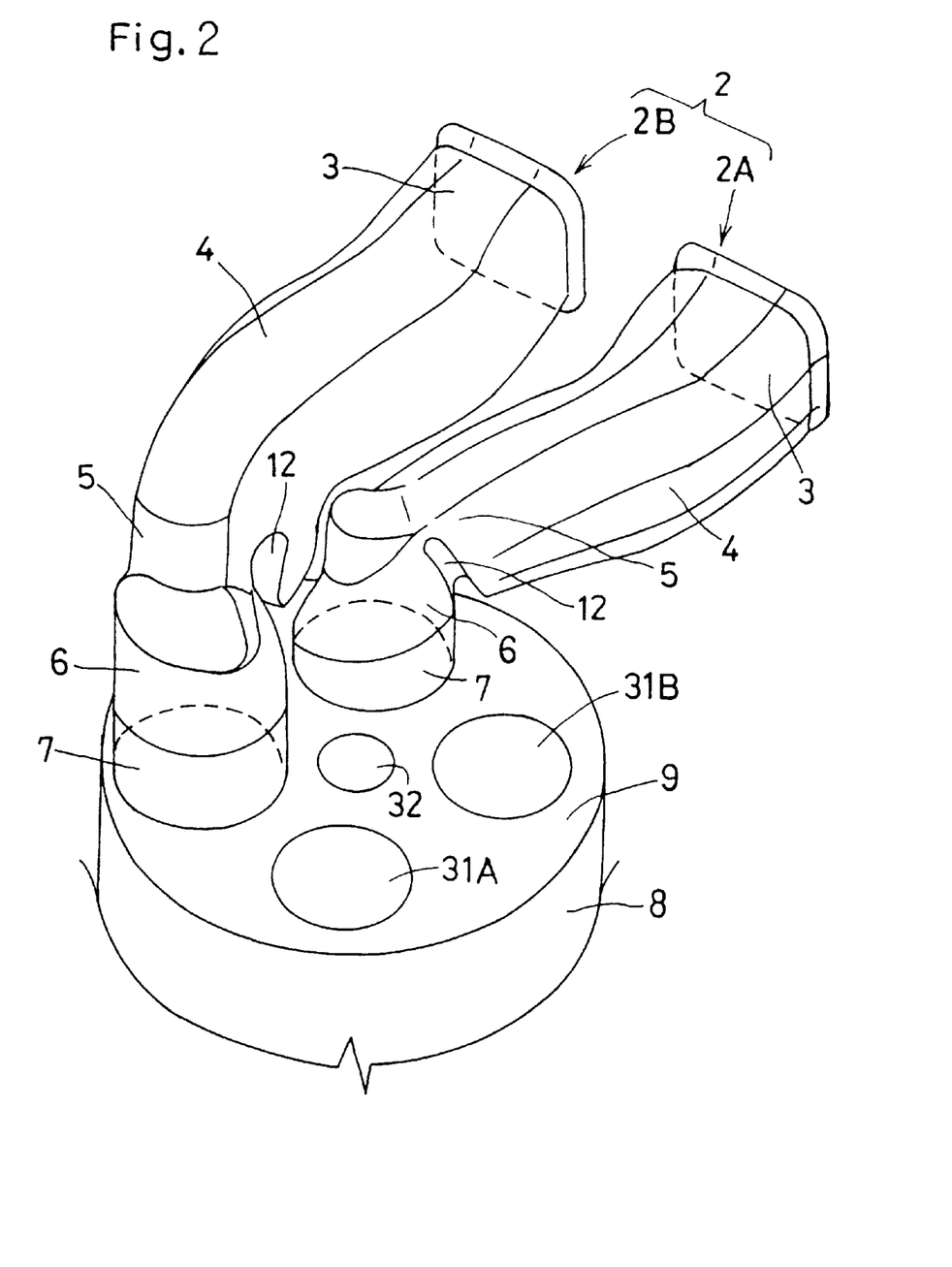
FIG. 2 is a perspective view of the direct double intake port shown in FIG. 1(A) to FIG. 1(E)

FIG. 2 is a perspective view of the direct double intake port of FIG. 1(A) to FIG. 1(E). FIG. 3 is a perspective view of the first direct intake port 2A shown in FIG. 1(A) to FIG. 1(E). FIG. 4 is a perspective view of the second direct intake port 2B shown in FIG. 1(A) to FIG. 1(E).

According to a first aspect of the present invention, an entire peripheral surface of the bent portion 5 has a peripheral side surface portion 11 close to the cylinder axis 10, which provides a means (S) for deviating an intake air current (A) far away from the cylinder axis 10.

The means (S) is formed so as to turn a direction of the intake air current (A) which flows from the upstream portion 4 to the downstream portion 6, from the peripheral side surface portion 11 toward an opposite peripheral side surface portion 13 situated far away from the cylinder axis 10.

According to a second aspect of the present invention, the entire peripheral surface of the bent portion 5 has a peripheral side surface portion 14 close to the upper end surface 9 of the cylinder chamber 8, which provides a means (T) for deviating the intake air current (A) far way from the upper end surface 9 of the cylinder chamber 8.

This means (T) is formed so as to turn the direction of the intake air current (A) which flows from the upstream portion 4 to the downstream portion 6, from the peripheral side surface portion 14 to an opposite peripheral side surface portion 16 situated far away from the upper end surface 9 of the cylinder chamber 8.

A third aspect of the present invention is a combination of the first aspect and the second aspect.

More specifically, the entire peripheral surface of the bent portion 5 has the peripheral side surface portion 11 close to the cylinder axis 10, which provides the means (S) for deviating the intake air current (A) far away from the cylinder axis 10.

This means (S) is formed so as to turn the direction of the intake air current (A) which flows from the upstream portion 4 to the downstream portion 6, from the peripheral side surface portion 11 toward the opposite peripheral side surface portion 13 situated far away from the cylinder axis 10.

The entire peripheral surface of the bent portion 5 has the peripheral side surface portion 14 close to the upper end surface 9 of the cylinder chamber 8, which provides the means (T) for deviating the intake air current (A) far away from the upper end surface 9 of the cylinder chamber 8.

This means (T) is formed so as to turn the direction of the intake air current (A) which flows from the upstream portion 4 to the downstream portion 6, from the peripheral side surface portion 14 close to the upper end surface 9 of the cylinder chamber 8 toward the opposite peripheral side surface portion 16 situated far away from the upper end surface 9 of the cylinder chamber 8.

A fourth aspect of the present invention is made by further adding the following construction to the direct intake port according to the first or the third aspect.

The means (S) comprises a projection 12 for deviating the intake air current (A) far away from the cylinder axis 10.

A fifth aspect of the present invention is made by further adding the following construction to the direct intake port according to the fourth aspect.

The projection 12 comprises a projected portion 18 near the peripheral side surface portion 14 close to the upper end surface 9 of the cylinder chamber 8 and a projected portion 19 close to the peripheral side surface portion 16 situated far away from the upper end surface 9 of the cylinder chamber 8. And it has a height made smaller at the projected portion 19 than at the projected portion 18.

A sixth aspect of the present invention is made by further adding the following construction to the direct intake port according to the second or the third aspect.

The means (T) comprises a projection (15) for deviating the intake air current (A) far away from the upper end surface (9) of the cylinder chamber (8).

A seventh aspect of the present invention is made by further adding the following construction to the direct intake port according to the sixth aspect.

The projection 15 comprises a projected portion 21 near the peripheral side surface portion 11 close to the cylinder axis 10 and a projected portion 22 close to the peripheral side surface portion 13 situated far away from the cylinder axis 10. And it has a height 20 made smaller at the projected portion 22 than at the projected portion 21.

An eighth aspect of the present invention is made by further adding the following construction to the direct intake port according to the first, third, fourth, fifth, sixth or seventh aspect.

Two ones 2A and 2B of the direct intake port 2 are provided for one cylinder chamber 8. These direct intake ports 2A and 2B are each provided with the means (S) for deviating the intake air current (A) far away from the cylinder axis 10.

A ninth aspect of the present invention is made by further adding the following construction to the direct intake port of the second, third, fourth, fifth, sixth or seventh aspect.

Two ones 2A and 2B of the direct intake port 2 are provided for one cylinder chamber 8. These direct intake ports 2A and 2B are each provided with the means (T) for deviating the intake air current (A) far away from the upper end surface 9 of the cylinder chamber 8.

Figure 7A:
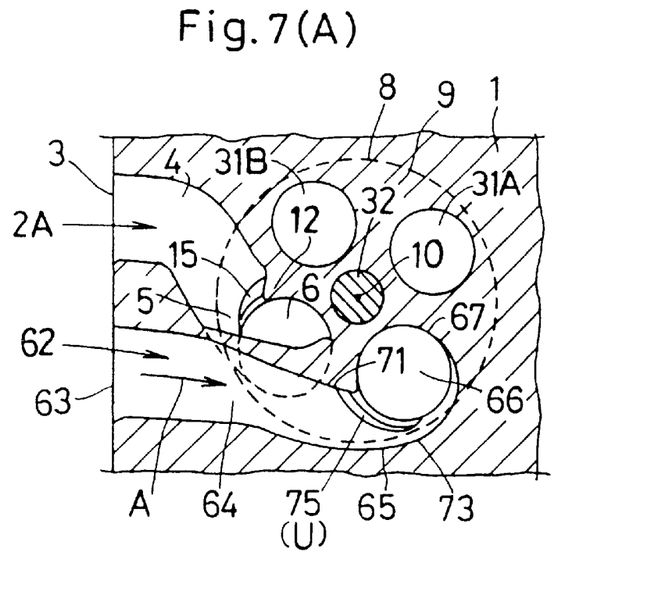
FIG. 7(A) is a cross sectional plan view.
Figure 7B:
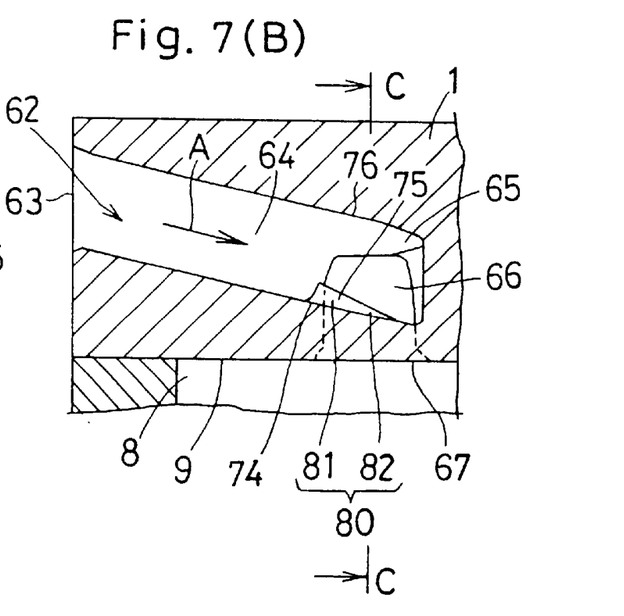
FIG. 7(B) is a vertical sectional front view of a helical intake port 62.
Figure 7C:
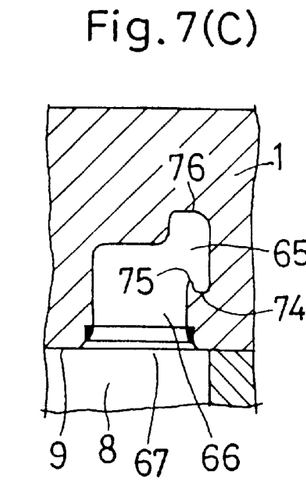
FIG. 7(C) is a sectional view taken along a line C—C in FIG. 7(B)

A helical intake port according to each of a tenth to a twelfth aspects of the present invention is constructed in the following manner, for example, as shown in FIG. 7(A) to FIG. 7(C).

FIG. 7(A) to FIG. 7(C) show a direct and helical double intake port for a vertical diesel engine according to a second embodiment of the present invention. FIG. 7(A) is a cross sectional front view.

FIG. 7(B) is a vertical sectional plan view of a helical intake port 62. FIG. 7(C) is a sectional view taken along a line C—C in FIG. 7(B).

The tenth aspect of the present invention first has a preamble structure comprising the helical intake port 62 formed in the cylinder head 1 of an engine. This helical intake port 62 is formed by communicating a port inlet 63 with a port outlet 67 through a port upstream portion 64, a port bent portion 65 and a port downstream portion 66 in order. This port outlet 67 is opened at a position eccentric from the cylinder axis 10 of the upper end surface 9 of the cylinder chamber 8.

Next, it has a characterizing construction where an entire peripheral surface of the bent portion 65 has a peripheral side surface portion 74 close to the upper end surface 9 of the cylinder chamber 8, which provides a means (U) for deviating the intake air current (A) far away from the upper end surface 9 of the cylinder chamber 8.

This means (U) is formed so as to turn a direction of the intake air current (A) which flows from the upstream portion 64 to the downstream portion 66, from the peripheral side surface portion 74 toward an opposite peripheral side surface portion 76 located far away from the upper end surface 9 of the cylinder chamber 8.

An eleventh aspect of the present invention is made by further adding the following construction to the helical intake port of the tenth aspect.

The means (U) comprises a projection 75 for deviating the intake air current (A) far away from the upper end surface 9 of the cylinder chamber 8.

The twelfth aspect of the present invention is made by further adding the following construction to the helical intake port of the eleventh aspect.

The projection 75 comprises a projected portion 81 near a peripheral side surface portion 71 close to the cylinder axis 10 and a projected portion 82 close to a peripheral side surface portion 73 located far away from the cylinder axis 10. And it has a height 80 made smaller at the projected portion 82 than at the projected portion 81.

The direct intake ports according to the 1st to 7th aspects of the present invention produce the following effects:

(1) The means (S) for deviating the intake air current (A) far away from the cylinder axis 10 accelerates flow speed of intake air and as a result strengthens swirl force apt to be insufficiently produced in the direct intake port 2 of superior volumetric efficiency by an amount corresponding to the acceleration of speed of a total flow (V4) of the intake air, thereby enhancing the mixing efficiency.

Figure 5:
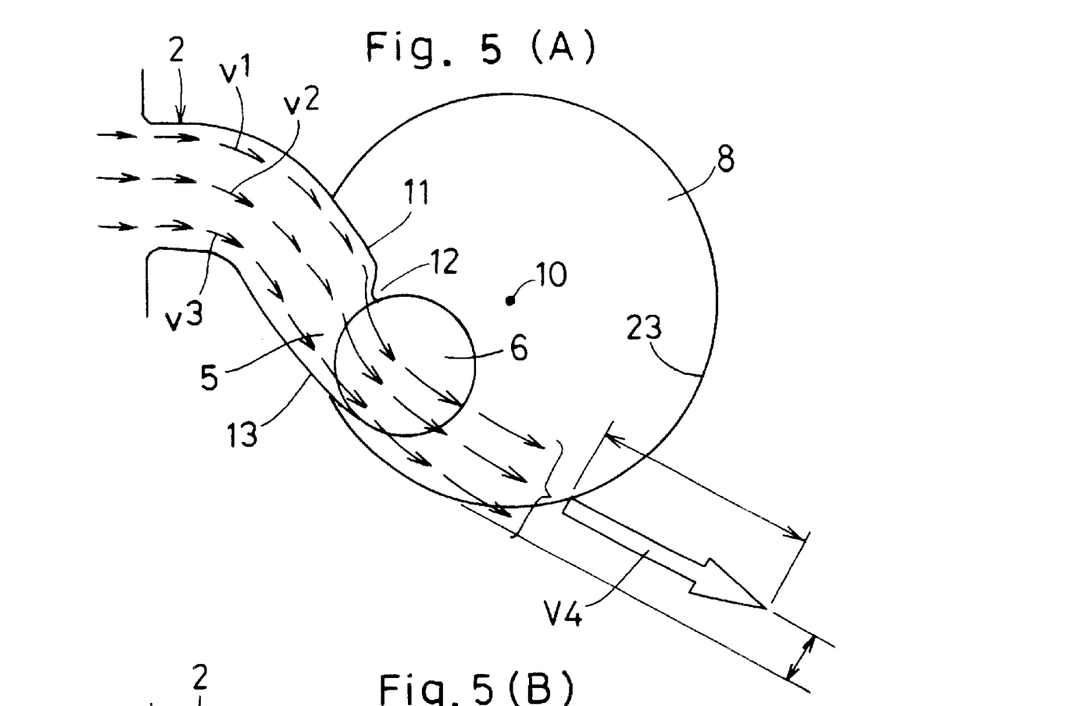
FIG. 5(A) shows a first aspect of the present invention and FIG. 5(B) illustrates prior art.

FIG. 5 is a plan view schematically showing the flow of the intake air within the direct intake port 2. FIG. 5(A) illustrates the first aspect of the present invention, while FIG. 5(B) shows the prior art.

In FIGS. 5(A) and 5(B), characters (V1), (V2) and (V3) designate an inward partial flow, an intermediate partial flow and an outward partial flow, respectively. And character (V4) indicates a total flow. In a situation where the intake air has flowed into the cylinder chamber 8 through the intake port 2, the inward partial flow (V1) and the outward partial flow (V3) come close to the cylinder axis 10 and an inner peripheral surface 23 of the cylinder chamber 8, respectively, while the intermediate partial flow (V2) exists between those partial flows.

According to the first aspect of the present invention, as shown in FIG. 5(A), the inward partial flow (V1) of the intake air flowing within the direct intake port 2 turns and rushes toward the peripheral side surface portion 13 by the means (S) when passing through the bent portion 5. Therefore, the inward partial flow (V1), intermediate partial flow (V2) and outward partial flow (V3) converge to be accelerated As a result, the total flow (V4) increases its speed and beside approaches the inner peripheral surface 23 of the cylinder chamber 8, thereby strengthening the swirl produced within the cylinder chamber 8. Thus, with the direct intake port 2 which has a property of being superior in volumetric efficiency but inferior in swirl force, it is possible to strengthen the swirl apt to be insufficient, enhance the mixing efficiency of air with fuel and improve the combustion performance.

The second aspect of the present invention produces the following effect:

(2) The means (T) for deviating the intake air current (A) far way from the upper end surface 9 of the cylinder chamber 8 accelerates the speed of a forward total flow (V14) of the intake air and besides delays the speed of a reverse flow (V17) to thereby strengthen the swirl by an amount corresponding to the acceleration of speed of the forward total flow (V14) and the delay of speed of the reverse flow (V17), which results in enhancing the mixing efficiency of the direct intake port superior in volumetric efficiency.

Figures 6A, 6B:
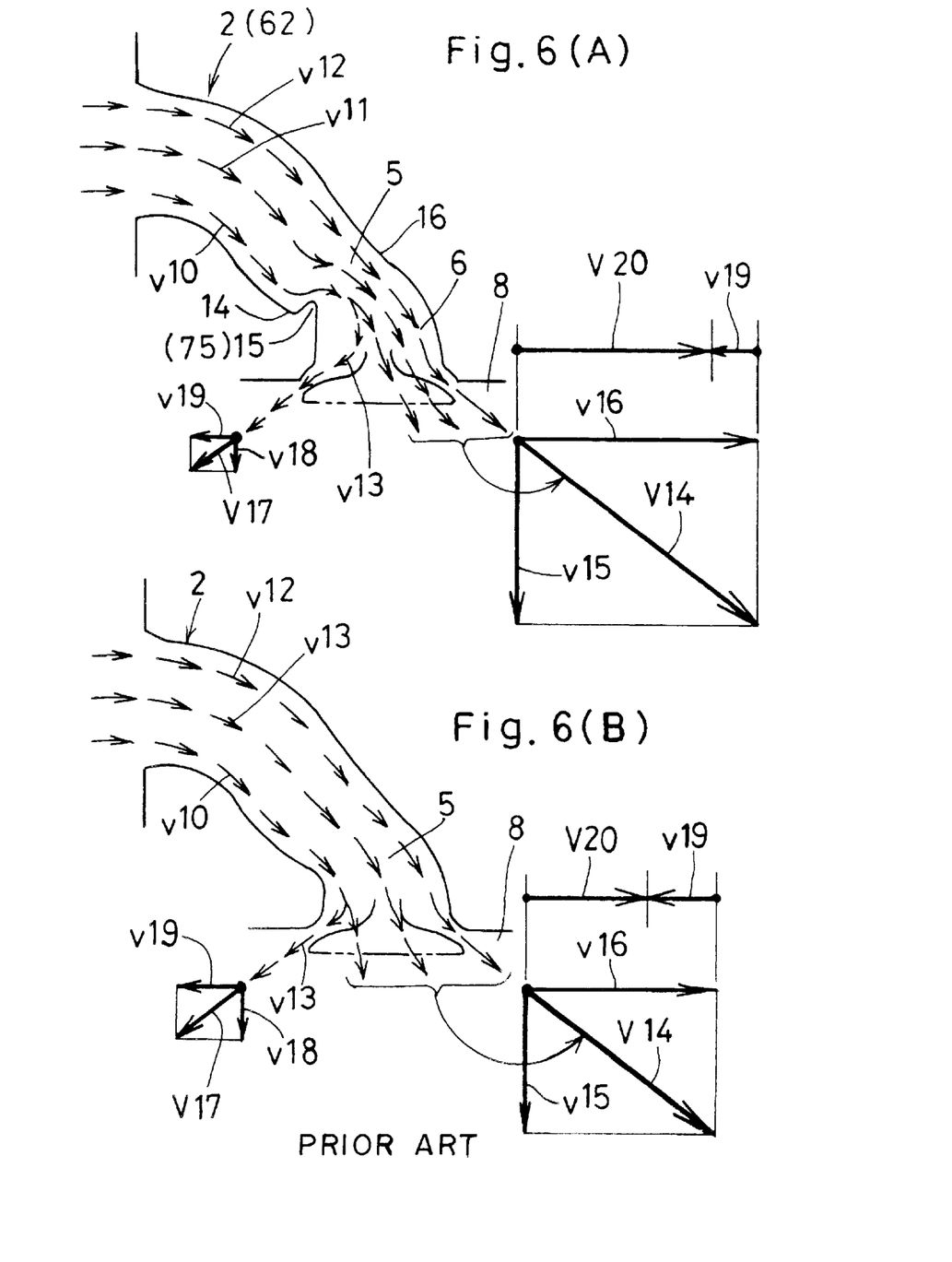

FIG. 6 is a vertical sectional front view schematically showing the flow of the intake air within the direct intake port 2. FIG. 6(A) shows the present invention and FIG. 6(B) illustrates the prior art.

In FIGS. 6(A) and 6(B), characters (V10), (V11), (V12), (V13) and (V14) designate a downward partial flow, an intermediate partial flow, an upward partial flow, an inverted partial flow and the forward total flow, respectively. Character (V15) indicates a vertical component force of (V14) and character (V16) does a horizontal component force of (V14). Character (V17) indicates the reverse flow. Character (V18) indicates a vertical component force of (V17) and character (V19) does a horizontal component force of (V17). Character (V20) designates a swirl forming force.

Within the intake port 2, the downward partial flow (V10), the upward partial flow (V12) and the intermediate partial flow (V11) pass through a lower layer, an upper layer and an intermediate layer, respectively. The inverted partial flow (V13) branches from the downward partial flow (V10) and makes an inversion within the downstream portion 6. The horizontal component force (V16) of the forward total flow (V14) comes to a force which forms a swirl within the cylinder chamber 8. The horizontal component force (V19) of the reverse flow (V17) weakens the swirl. Then a force resulting by subtracting the horizontal component force (V19) of the reverse flow (V17) from the horizontal component force (V16) of the forward total flow (V14) come to the swirl forming force (V20).

According to the second aspect of the present invention, as shown in FIG. 6(A), the downward partial flow (V10) vigorously turns and rushes toward the peripheral side surface portion 16 by the means (T) when passing through the bent portion 5. Therefore, the downward partial flow (V10), intermediate partial flow (V11) and upward partial flow (V12) converge to be accelerated.

As a result, the forward total flow (V14) increases its speed to thereby enlarge the horizontal component force (V16) of the total flow (V14) and besides delays the speed of the reverse flow (V17) with the result of decreasing the reverse horizontal component force (V19) of this reverse flow (V17). Thus the swirl forming force (V20) enlarges to strengthen the swirl produced within the cylinder chamber 8. This enables the direct intake port 2 superior in volumetric efficiency but inferior in swirl force to strengthen the swirl apt to be insufficient, enhance the mixing efficiency of air with fuel and improve the combustion performance.

(3) The third aspect of the present invention enables the direct intake port 2 to doubly strengthen the swirl apt to be insufficient, thereby further enhancing the mixing efficiency.

The third aspect of the present invention can achieve both of the following effects (1) and (2) produced by the first and second aspects of the present invention:

(1) Accelerating the flow speed of the intake air by the means (S) to strengthen the swirl force by the amount corresponding to the acceleration of speed of the total flow (V4) of the intake air and thereby enhance the mixing efficiency; and (2) Accelerating the speed of the forward total flow (V14) of the intake air and besides delaying the speed of the reverse flow (V17) to strengthen the swirl by the amount corresponding to the acceleration and the delay.

Thus it is possible to doubly strengthen the swirl apt to be insufficient and therefore further enhance the mixing efficiency of air with fuel.

(4) The fourth aspect of the present invention can simplify the construction of the means (S) for deviating the intake air current (A) far away from the cylinder axis 10 to achieve the effect (1) of the first aspect, manufacture the means (S) at a low cost and further make it excellent in durability and reliability.

The means (S) comprises a projection 12. Therefore, only the projection 12 is sufficient for the construction of the means (S) to accomplish the effect (1) produced by the first aspect of the present invention. This can simplify the construction of the means (S), manufacture the means (S) at a low cost and besides make it excellent in durability and reliability.

(5) The fifth aspect of the present invention enables the direct intake port 2 to strengthen the swirl and at the same time retain the property of superior volumetric efficiency at a high level.

The projection 12 has the height 17 made larger at the projected portion 18 near the peripheral side surface portion 14 close to the upper end surface 9 of the cylinder chamber 8. This construction effectively deviates and converges the intake air current (A) by the projected portion 18 without passing it straightly to the cylinder chamber 8. Thus it is possible to secure the foregoing effect (1) produced by the first aspect of the present invention In addition, the projection 12 has the height 17 made smaller at the projected portion 19 close to the peripheral side surface portion 16 situated far away from the upper end surface 9 of the cylinder chamber 8. Owing to this construction, the bent portion 5 increases a passage sectional area and decreases a passage resistance by an amount corresponding to a height difference due to which the projected portion 19 is made lower than the projected portion 18. Thus it is possible to retain the property of superior volumetric efficiency of the direct intake port 2 at a high level.

(6) The sixth aspect of the present invention can simplify the construction of the means (T) for deviating the intake air current (A) far away from the upper end surface 9 of the cylinder chamber 8 to achieve the effect (2) of the second aspect, manufacture the means (T) at a low cost and besides make it excellent in durability and reliability.

The means (T) comprises a projection 15. Therefore, only the projection 15 is sufficient for the construction of the means (T) to accomplish the effect (2) produced by the second aspect of the present invention. This can simplify the construction of the means (T), manufacture the means (T) at a low cost and besides make it excellent in durability and reliability.

(7) The seventh aspect of the present invention enables the direct intake port 2 to strengthen the swirl and at the same time retain the property of superior volumetric efficiency at a high level.

The projection 15 has the height 20 made larger at the projected portion 21 near the peripheral side surface portion 11 close to the cylinder axis 10. This construction effectively deviates and converges the intake air current (A) by the projected portion 21 without passing it straightly to the cylinder chamber 8. Thus it is possible to secure the effect (2) produced by the second aspect of the present invention.

Besides, the projection 15 has the height 20 made smaller at the projected portion 22 close to the peripheral side surface portion 13 situated far away from the cylinder axis 10. Owing to this construction, the bent portion 5 increases the passage sectional area and decreases the passage resistance by an amount corresponding to a height difference due to which the projected portion 22 is made lower than the projected portion 21. Thus it is possible to retain the property of the superior volumetric efficiency of the direct intake port 2 at a high level.

(8) The eighth aspect of the present invention enables an engine with the direct double intake port to further promote its high output, low fuel consumption and reduction of unburnt poisonous substances contained in the exhaust gas.

The direct double intake port comprises two direct intake ports 2A and 2B provided for one cylinder chamber and is particularly superior in volumetric efficiency as is well known.

The two direct intake ports 2A and 2B are each provided with the means (S) for deviating the intake air current (A) far away from the cylinder axis 10. Owing to this construction, both of the two direct intake ports 2A and 2B can produce the effect (1) of the first aspect to accelerate the flow speed of the intake air by the means (S) and thereby strengthen the swirl force by the amount corresponding to the acceleration of speed of its total flow (V4) with the result of enhancing the mixing efficiency.

This enables the engine with the direct double intake port particularly superior in volumetric efficiency to strengthen the swirl and eventually enhance the mixing efficiency, thereby further promoting its high output, low fuel consumption and reduction of unburnt poisonous substances (such as carbon monoxide, hydrocarbon and particulate) in the exhaust gas.

(9) The ninth aspect of the present invention enables the engine with the direct double intake port to further promote its high output, low fuel consumption and reduction of unburnt poisonous substances in the exhaust gas.

The direct double intake port comprises two direct intake ports 2A and 2B provided for one cylinder chamber 8 and is particularly excellent in volumetric efficiency as is well known.

These two direct intake ports 2A and 2B are each provided with the means (T) for deviating the intake air current (A) far away from the upper end surface 9 of the cylinder chamber 8. Owing to this construction, both of the two direct intake ports 2A and 2B can produce the effect (2) of the second aspect to accelerate the speed of the forward total flow (V14) of the intake air and besides delay the speed of its reverse flow (V17) through the means (T), thereby strengthening the swirl by the amount corresponding to the acceleration and the delay.

This enables the engine with the direct double intake port of superior volumetric efficiency to strengthen the swirl and eventually enhance the mixing efficiency, thereby further promoting its high output, low fuel consumption and reduction of unburnt poisonous substances (such as carbon monoxide, hydrocarbon and particulate) in the exhaust gas.

A helical intake port according to each of the tenth to twelfth aspects of the present invention produces the following effects:

(10) The tenth aspect of the present invention accelerates the speed of the forward total flow (V14) of the intake air and delays the speed of its reverse flow (V17) through the means (U) for deviating the intake air current (A) far away from the upper end surface 9 of the cylinder chamber 8 to strengthen the swirl by an amount corresponding to the acceleration and the delay, thereby further promoting the mixing efficiency of the helical intake port 62.

The means (U) according to the tenth aspect functions in the same manner as the means (T) of the direct intake port 2 according to the second aspect of the present invention and produces the same effect as the foregoing one (2) of the second aspect.

Thus, as shown in FIG. 6(A), the means (U) can accelerate the speed of the forward total flow (V14) of the intake air and besides delay the speed of its reverse flow (V17) to thereby strengthen the swirl by an amount corresponding to the acceleration and the delay and eventually further enhance the mixing efficiency of the helical intake port 62.

(11) The eleventh aspect of the present invention can simplify the construction of the means (U) for deviating the intake air current (A) far away from the upper end surface 9 of the cylinder chamber 8 to achieve the effect (10) of the tenth aspect, manufacture the means (U) at a low cost and make it excellent in durability and reliability.

The means (U) comprises a projection 75. Therefore, only the projection 75 is sufficient for the construction of the means (U) to accomplish the above effect (10) produced by the tenth aspect of the present invention. This can simplify the construction of the means (U), manufacture the means (U) at a low cost and besides make it excellent in durability and reliability.

(12) The twelfth aspect of the present invention enables the helical intake port 62 to strengthen the swirl and at the same time retain the volumetric efficiency at a high level.

The projection 75 has the height 80 made larger at the projected portion 81. This construction effectively deviates and converges the intake air current (A) by the projected portion 81 without passing it straightly to the cylinder chamber 8.

Thus it is possible to secure the foregoing effect (10) of the tenth aspect.

Additionally, the projection 75 has the height 80 made smaller at the projected portion 82. Owing to this construction, the bent portion 65 increases a passage sectional area and decreases a passage resistance by an amount corresponding to a height difference due to which the projected portion 82 is made lower than the projected portion 81. Thus it is possible to retain the volumetric efficiency of the helical intake port 62 at a high level.

BRIEF DESCRIPTION OF THE DRAWINGS

FIG. 1(A) to FIG. 1(E) show a direct double intake port for a vertical diesel engine according to a first embodiment of the present invention;

FIGS. 5(A) and 5(B) are plan views each schematically showing a flow of intake air within the direct intake port 2;

FIGS. 6(A) and 6(B) are vertical sectional front views each schematically showing the flow of the intake air within the direct intake port 2.

FIG. 6(A) shows the present invention and FIG. 6(B) illustrates the prior art;

FIG. 7(A) to FIG. 7(C) show a direct and helical double intake port for a vertical diesel engine according to a second embodiment of the present invention;

FIG. 8(A) to FIG. 8(C) show a conventional direct double intake port for a vertical diesel engine;

DESCRIPTION OF THE PREFERRED EMBODIMENTS

First Embodiment

Hereafter, explanation is given for a direct double intake port provided per cylinder in a vertical multi-cylinder engine of four-valve fuel direct injection type, according to a first embodiment of the present invention, with reference to FIG. 1(A) to FIG. 1(E), FIGS. 2 to 4, FIG. 5(A) and FIG. 6(A).

FIG. 1(A) to FIG. 1(E) show the direct double intake port. FIG. 1(A) is a cross sectional plan view. FIG. 1(B) is a vertical sectional front view of a first direct intake port 2A. FIG. 1(C) is a sectional view taken along a line C—C in FIG. 1(B). FIG. 1(D) is a vertical sectional front view of a second direct intake port 2B. FIG. 1(E) is a sectional view taken along a line E—E in FIG. 1(D)

Figures 3A, 3B, 3C:
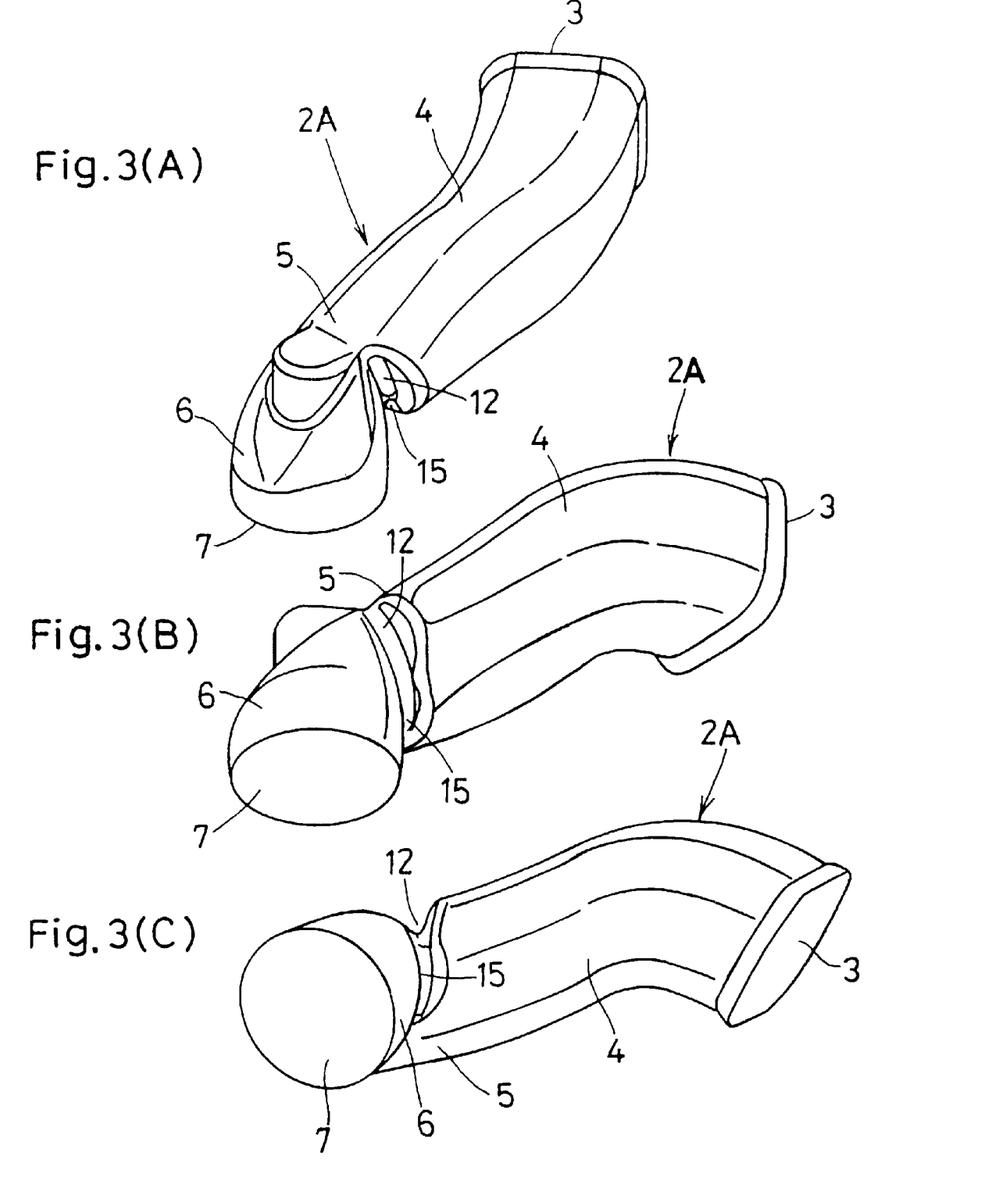
FIG. 3 is a perspective view of the first direct intake port 2A shown in FIG. 1(A) to FIG. 1(E)
Figures 4A, 4B, 4C:
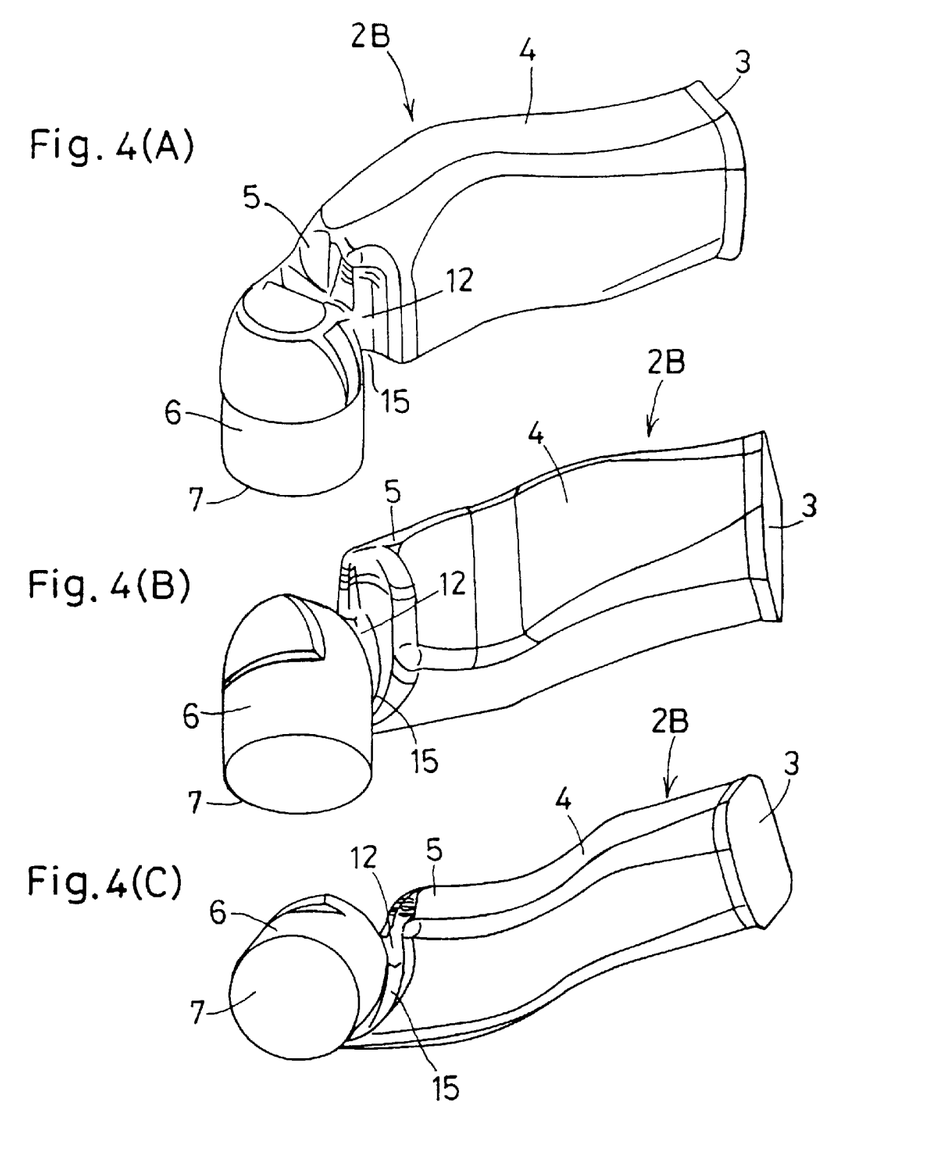
FIG. 4(A) to FIG. 4(C) show a perspective view of the second direct intake port 2B shown in FIG. 1(A) to FIG. 1(E)

FIG. 2 is a perspective view of the direct double intake port shown in FIG.1(A) to FIG. 1(E). FIGS. 3(A) to 3(C) show a perspective view of the first direct intake port 2A shown in FIG. 1(A) to FIG. 1(E). FIGS. 4(A) to 4(C) show a perspective view of the second direct intake port 2B shown in FIG. 1(A) to FIG. 1(E).

FIG. 5(A) is a plan view schematically showing a flow of intake air within a direct intake port 2 (note FIG. 5(B) shows prior art). FIG. 6(A) is a vertical sectional front view schematically showing the flow of the intake air within the direct intake port 2 (note FIG. 6(B) shows the prior art).

A vertical multi-cylinder diesel engine of four-valve fuel direct injection type has a cylinder head 1 provided with the direct intake port 2. Two ones 2A and 2B of the direct intake port 2 are provided for each of cylinder chambers 8. Numerals 31A and 31B in FIG. 1(A) indicate exhaust ports and numeral 32 designates a fuel injection nozzle.

Each of the direct intake ports 2A and 2B is formed by communicating a port inlet 3 with a port outlet 7 through a port upstream portion 4, a port bent portion 5 and a port downstream portion 6 in order. The port outlet 7 is opened at a position eccentric from a cylinder axis 10 of an upper end surface 9 of the cylinder chamber 8.

In each of the direct intake ports 2A and 2B, an entire peripheral surface of the bent portion 5 has a peripheral side surface portion 11 close to the cylinder axis 10. The peripheral side surface portion 11 provides a means (S) for deviating an intake air current (A) far away from the cylinder axis 10. This means (S) comprises a projection 12.

The projection 12 is formed so as to turn a direction of the intake air current (A) which flows from the upstream portion 4 to the downstream portion 6, from the peripheral side surface portion 11 toward an opposite peripheral side surface portion 13 situated far away from the cylinder axis 10.

As shown in FIGS. 1(C) and 1(E), the projection 12 has a linear ridge line spreading slantingly and downwardly. It comprises a projected portion 18 near a peripheral side surface portion 14 close to the upper end surface 9 of the cylinder chamber 8 and a projected portion 19 close to a peripheral side surface portion 16 situated far away from the upper end surface 9 of the cylinder chamber 8. And it has a height 17 made smaller at the projected portion 19 than at the projected portion 18.

In each of the direct intake ports 2A and 2B, the entire peripheral surface of the bent portion 5 has the peripheral side surface portion 14, which provides a means (T) for deviating the intake air current (A) far away from the upper end surface 9 of the cylinder chamber 8. This means (T) comprises a projection 15

The projection 15 is formed so as to turn the direction of the intake air current (A) which flows from the upstream portion 4 to the downstream portion 6, from the peripheral side surface portion 14 toward an opposite peripheral side surface portion 16 located far away from the upper end surface 9 of the cylinder chamber 8.

As shown in FIGS. 1(C) and 1(E), the projection 15 has a linear ridge line slanting downwards and rightwards. Further, it comprises a projected portion 21 near the peripheral side surface portion 11 close to the cylinder axis 10 and a projected portion 22 close to the peripheral side surface portion 13 positioned far away from the cylinder axis 10. And it has a height 20 made smaller at the projected portion 22 than at the projected portion 21.

Modifications of the First Embodiment

The first embodiment has a construction part of which may be modified as follows.

Modification 1

The projection 15 may be omitted while the projection 12 remains.

Modification 2

The projection 12 may be omitted while the projection 15 remains.

Modification 3

The projection 12 may have a ridge line slantingly and downwardly widening in a concave or a convex curved manner.

Modification 4

The projection may have a ridge line vertically linear and have a height 17 made equal at the projected portion 18 and at the projected portion 19.

Modification 5

The projection 12 extends from a lower portion of the peripheral side surface portion 11 of the bent portion 5 to a middle portion of the latter's height but may be omitted at an upper portion thereof.

Modification 6

The projection 15 has a ridge line slanting rightwards and downwards in a concave or a convex curved manner.

Modification 7

The projection 15 has a ridge line horizontally linear and has a height 20 made equal at the projected portion 21 and at the projected portion 22.

Modification 8

The projection 15 extends from a left portion of the peripheral side surface portion 14 of the bent portion 5 to a middle portion of the latter's width but may be omitted at a right portion thereof.

Modification 9

Any one of the first embodiment or the modifications 1 to 8 is applied to a direct intake port of single type in which only one direct intake port 2 is provided for one cylinder chamber 8.

Modification 10

Any one of the first embodiment or the modifications 1 to 9 is applied to a gasoline engine or a gas engine.

Second Embodiment

Hereafter, explanation is given for a direct and helical double intake port provided per cylinder in a vertical multi-cylinder diesel engine of four-valve fuel direct injection type according to a second embodiment, with reference to FIG. 7(A) to FIG. 7(C).

FIG. 7(A) to FIG. 7(C) show the direct and helical double intake port. FIG. 7(A) is a cross sectional plan view. FIG. 7(B) is a vertical sectional front view of a helical intake port 62. FIG. 7(C) is a sectional view taken along a line C—C in FIG. 7(B).

The direct and helical double intake port according to the second embodiment is constructed by altering only part of the structure of the direct double intake port according to the first embodiment as follows.

More specifically, the second direct port 2B is changed to the helical intake port 62 while the first direct port 2A of the first embodiment remains as it is. Hereafter, explanation is given only for the construction of the substituted helical intake port 62.

An engine has a cylinder head 1 provided with the helical intake port 62. The helical intake port 62 is formed by communicating a port inlet 63 with a port outlet 67 through a port upstream portion 64, a port bent portion 65 and a port downstream portion 66 in order. The port outlet 67 is opened at a position eccentric from the cylinder axis 10 of the upper end surface 9 of the cylinder chamber 8.

An entire peripheral surface of the bent portion 65 has a peripheral side surface portion 74 close to the upper end surface 9 of the cylinder chamber 8. The peripheral side surface portion 74 provides a means (U) for deviating the intake air current (A) far away from the upper end surface 9 of the cylinder chamber 8. The means (U) comprises a projection 75.

The projection 75 is formed so as to turn the direction of the intake air current (A) which flows from the upstream portion 64 to the downstream portion 66, from the peripheral side surface portion 74 toward an opposite peripheral side surface portion 76 located far away from the upper end surface 9 of the cylinder chamber 8.

The projection 75 has a linear ridge line slanting rightwards and downwardly. Further, it comprises a projected portion 81 near a peripheral side surface portion 71 close to the cylinder axis 10 and a projected portion 82 close to a peripheral side surface portion 73 positioned far away from the cylinder axis 10. And it has a height 80 made smaller at the projected portion 82 than at the projected portion 81.

Modifications of the Second Embodiment

The second embodiment has a structure part of which may be modified as follows.

Modification 1

The projection 75 has a ridge line slanting rightwards and downwards in a concave or a convex curved manner.

Modification 2

The projection 75 has a ridge line horizontally linear and has a height 80 made equal at the projected portion 81 and at the projected portion 82.

Modification 3

The projection 75 extends from a left portion of the peripheral side surface portion 14 of the bent portion 5 to a middle portion of the latter's width but may be omitted at a right portion thereof.

Modification 4

Any one of the second embodiment or the modifications 1 to 3 is applied to a helical intake port of single type in which only one helical intake port 62 is provided for one cylinder chamber 8.

Modification 5

Any one of the second embodiment or the modifications 1 to 4 is applied to a gasoline engine or a gas engine.

What is claimed is:

1. A direct intake port (2) for an engine provided in a cylinder head (1) of the engine and formed by communicating a port inlet (3) with a port outlet (7) through a port upstream portion (4), a port bent portion (5) and a port downstream portion (6), the port outlet (7) being opened at a position eccentric from a cylinder axis (10) of an upper end surface (9) of a cylinder chamber (8), wherein an entire peripheral surface of the bent portion (5) has a first peripheral side surface portion (11) close to the cylinder axis (10), which provides a means (S) for deviating an intake air current (A) far away from the cylinder axis (10), the means (S) being formed so as to turn a direction of the intake air current (A) which flows from the upstream portion (4) to the downstream portion (6), from the first peripheral side surface portion (11) toward an opposite second peripheral side surface portion (13) situated far away from the cylinder axis (10), and the entire peripheral surface of the bent portion (5) has a third peripheral side surface portion (14) close to the upper end surface (9) of the cylinder chamber (8), which provides a means (T) for deviating the intake air current (A) far away from the upper end surface (9) of the cylinder chamber (8), the means (T) being formed so as to turn the direction of the intake air current (A) which flows from the upstream portion (4) to the downstream portion (6), from the third peripheral side surface portion (14) toward an opposite fourth peripheral side surface portion (16) situated far away from the upper end surface (9) of the cylinder chamber (8).

2. The direct intake port according to claim 1, wherein the means (S) comprises a first projection (12) and the means (T) comprises a second projection (15).

3. A direct intake port (2) for an engine provided in a cylinder head (1) of the engine and formed by communicating a port inlet (3) with a port outlet (7) through a port upstream portion (4), a port bent portion (5) and a port downstream portion (6), the port outlet (7) being opened at a position eccentric from a cylinder axis (10) of an upper end surface (9) of a cylinder chamber (8), wherein an entire peripheral surface of the bent portion (5) has a first peripheral side surface portion (11) close to the cylinder axis (10), which provides a means (S) for deviating an intake air current (A) far away from the cylinder axis (10), the means (S) being formed so as to turn a direction of the intake air current (A) which flows from the upstream portion (4) to the downstream portion (6), from the first peripheral side surface portion (11) toward a second opposite peripheral side surface portion (13) situated far away from the cylinder axis (10); and said means (S) comprises a first projection (12), said first projection (12) comprising a first projected portion (18) near a third peripheral side surface portion (14) close to the upper end surface (9) of the cylinder chamber (8) and a second projected portion (19) close to a fourth peripheral side surface portion (16) situated far away from the upper end surface (9) of the cylinder chamber (8), and having a height (17) made smaller at the second projected portion (19) than at the first projected portion (18).

4. A direct intake port (2) for an engine provided in a cylinder head (1) of the engine and formed by communicating a port inlet (3) with a port outlet (7) through a port upstream portion (4), a port bent portion (5) and a port downstream portion (6), the port outlet (7) being opened at a position eccentric from a cylinder axis (10) of an upper end surface (9) of a cylinder chamber (8), wherein an entire peripheral surface of the bent portion (5) has a third peripheral side surface portion (14) close to the upper end surface (9) of the cylinder chamber (8), which provides a means (T) for deviating an intake air current (A) far away from the upper end surface (9) of the cylinder chamber (8), the means (T) being formed so as to turn a direction of the intake air current (A) which flows from the upstream portion (4) to the downstream portion (6), from the third peripheral side surface portion (14) toward a fourth peripheral side surface portion (16) situated far away from the upper end surface (9) of the cylinder chamber (8); and said means (T) comprises a second projection (15), said second projection (15) comprising a third projected portion (21) near a first peripheral side surface portion (11) close to the cylinder axis (10) and a fourth projected portion (22) close to a second peripheral side surface portion (13) situated far away from the cylinder axis (10), and having a height (20) made smaller at the fourth projected portion (22) than at the third projected portion (21).

5. The direct intake port according to claim 3 including the means (T) as claimed in claim 17.

6. A helical intake port (62) for an engine provided in a cylinder head (1) of the engine and formed by communicating a port inlet (63) with a port outlet (67) through a port upstream portion (64), a port bent portion (65) and a port downstream portion (66), the port outlet (67) being opened at a position eccentric from a cylinder axis (10) of an upper end surface (9) of a cylinder chamber (8), wherein an entire peripheral surface of the bent portion (65) has a peripheral side surface portion (74) close to the upper end surface (9) of the cylinder chamber (8), which provides a means (U) for deviating an intake air current (A) far away from the upper end surface (9) of the cylinder chamber (8), the means (U) being formed so as to turn a direction of the intake air current (A) which flows from the upstream portion (64) to the downstream portion (66), from the peripheral side surface portion (74) toward an opposite peripheral side surface portion (76) situated far away from the upper end surface (9) of the cylinder chamber (8);

said means (U) comprises a third projection (75), said projection (75) comprising a fifth projected portion (81) near a fifth peripheral side surface portion (71) close to the cylinder axis (10) and a sixth projected portion (82) close to a sixth peripheral side surface portion (73) situated far away from the cylinder axis (10), and having a height (80) made smaller at the sixth projected portion (82) than at the fifth projected portion (81).

7. The direct intake port as set forth in claim 1, 2 or 3 wherein two ones (2A, 2B) of the direct intake port (2) are provided for one cylinder chamber (8), the two direct intake ports (2A, 2B) being each provided with the means (S) for deviating the intake air current (A) far away from the cylinder axis (10).

8. The direct intake port as set forth in claim 1, 2 or 4 wherein two ones (2A, 2B) of the direct intake port (2) are provided for one cylinder chamber (8), the two direct intake ports (2A, 2B) being each provided with the means (T) for deviating the intake air current (A) far away from the upper end surface (9) of the cylinder chamber (8).

* * * * *